(12) United States Patent
    Bengtsson (10) Patent No.: US 10,735,167 B2
(45) Date of Patent: Aug. 4, 2020

(54) PILOT TMIE SLOT HOPPING

(71) Applicant: SONY MOBILE COMMUNICATIONS INC., Tokyo (JP)

(72) Inventor: Erik Bengtsson, Eslöv (SE)

(73) Assignee: SONY CORPORATION, Tokyo (JP)

( * ) Notice: Subject to any disclaimer, the term of this patent is extended or adjusted under 35 U.S.C. 154(b) by 103 days.

(21) Appl. No.: 16/130,103

(22) Filed: Sep. 13, 2018

(65) Prior Publication Data
    US 2019/0013918 A1    Jan. 10, 2019

Related U.S. Application Data

(63) Continuation of application No. 14/413,382, filed as application No. PCT/IB2014/060314 on Mar. 31, 2014, now abandoned.

(51) Int. Cl.
    *H04L 5/00* (2006.01)
    *H04B 7/0413* (2017.01)
    *H04L 5/14* (2006.01)

(52) U.S. Cl.
    CPC ......... *H04L 5/0051* (2013.01); *H04B 7/0413* (2013.01); *H04L 5/0073* (2013.01); *H04L 5/0082* (2013.01); *H04L 5/14* (2013.01); *H04L 5/0092* (2013.01)

(58) Field of Classification Search
    None
    See application file for complete search history.

(56) References Cited

U.S. PATENT DOCUMENTS

| 2004/0260985 | A1 | 12/2004 | Krieger |
| 2006/0009227 | A1 | 1/2006 | Cudak et al. |
| 2006/0050662 | A1 | 3/2006 | Rizvi et al. |
| 2006/0233125 | A1* | 10/2006 | Pajukoski ............ H04B 1/7103 370/320 |
| 2007/0268982 | A1* | 11/2007 | Inanoglu ................ H04B 1/715 375/267 |

(Continued)

FOREIGN PATENT DOCUMENTS

| CN | 101657975 A | 2/2010 |
| WO | WO-2013176935 A1 * | 11/2013 ............ H04W 16/14 |

OTHER PUBLICATIONS

International Search Report and Written Opinion; dated Nov. 25, 2014; issued in International Patent Application No. PCT /I B2014/060314.

(Continued)

*Primary Examiner* — Alpus Hsu
*Assistant Examiner* — Camquyen Thai
(74) *Attorney, Agent, or Firm* — Tucker Ellis LLP (57) ABSTRACT

Embodiments are directed to systems, methods and computer program products for pilot time slot hopping to mitigate interference-based pilot time slot contamination. Embodiments include generating a multiple input multiple output (MIMO) system message frame structure comprising a header comprising a plurality of header time slots, an uplink (UL) time slot (optional), and a downlink (DL) time slot. Generating includes determining, based on a predetermined scheme, allocation of at least one of the plurality of header time slots to at least one user device within a predetermined area.

21 Claims, 5 Drawing Sheets

(56) References Cited

U.S. PATENT DOCUMENTS

| | | | |
|---|---|---|---|
| 2008/0187027 A1* | 8/2008 | Malladi | H04B 1/713 |
| | | | 375/135 |
| 2008/0225993 A1* | 9/2008 | Malladi | H04L 5/0007 |
| | | | 375/340 |
| 2009/0168730 A1* | 7/2009 | Baum | H04L 5/0007 |
| | | | 370/336 |
| 2010/0008460 A1 | 1/2010 | Zhang et al. | |
| 2010/0014477 A1 | 1/2010 | Schliwa-Bertling et al. | |
| 2010/0020771 A1* | 1/2010 | Ji | H04W 52/243 |
| | | | 370/336 |
| 2010/0246539 A1* | 9/2010 | Guillouard | H04B 7/2656 |
| | | | 370/336 |
| 2011/0075625 A1 | 3/2011 | Nystrom et al. | |
| 2011/0143674 A1* | 6/2011 | Lim | H04W 72/082 |
| | | | 455/63.1 |
| 2011/0188592 A1* | 8/2011 | Sandhu | H04L 25/0204 |
| | | | 375/260 |
| 2013/0121189 A1 | 5/2013 | Bhallad et al. | |
| 2013/0301570 A1 | 11/2013 | Xu et al. | |
| 2014/0073343 A1 | 3/2014 | Nagaraja et al. | |
| 2014/0204785 A1* | 7/2014 | Kim | H04W 24/08 |
| | | | 370/252 |
| 2015/0131580 A1* | 5/2015 | Liu | H04B 7/0452 |
| | | | 370/329 |
| 2015/0162961 A1* | 6/2015 | Jalloul | H04B 7/0452 |
| | | | 370/330 |

OTHER PUBLICATIONS

International Preliminary Report on Patentability; dated Oct. 13, 2016; issued in International Patent Application No. DCT/IB2014/060314.

Office Action from corresponding Chinese Application No. 201480077708.5, dated Sep. 27, 2018.

\* cited by examiner

```
┌─────────────────────────────────────────────────────┐
│  GENERATING A MIMO SYSTEM MESSAGE FRAME STRUCTURE   │
│  INCLUDING A HEADER COMPRISING A PLURALITY OF HEADER│
│  TIME SLOTS, AN UPLINK TIMESLOT AND A DOWNLINK TIMESLOT │
│                         310                         │
└─────────────────────────────────────────────────────┘
                          │
                          ▼
┌─────────────────────────────────────────────────────┐
│    DETERMINING, BASED ON A PREDETERMINED PSEUDO-    │
│   RANDOM SCHEME, ALLOCATION OF AT LEAST ONE OF THE  │
│   PLUARLITY OF HEADER TIMESLOTS TO AT LEAST ONE USER│
│         DEVICE WITHIN A PREDETERMINED AREA          │
│                         320                         │
└─────────────────────────────────────────────────────┘
                          │
                          ▼
┌─────────────────────────────────────────────────────┐
│      DETERMINING RE-ALLOCATION, BASED ON THE        │
│  PREDETERMINED PSEUDO-RANDOM SCHEME, PERIODICALLY,  │
│  OF AT LEAST ONE OF THE PLURALITY OF HEADER TIMESLOTS│
│  TO AT LEAST ONE USER DEVICE WITHIN THE PREDETERMINED│
│                         AREA                        │
│                         330                         │
└─────────────────────────────────────────────────────┘
```

```
DYNAMICALLY SELECTING, IN ORDER TO AVOID ALLOCATION
OF THE SAME HEADER TIMESLOTS TO MULTIPLE USER
DEVICES, A DIFFERENT PREDETERMINED PSEUDO-RANDOM
SCHEME FOR EACH RE-ALLOCATION OF HEADER TIMESLOTS
510
```

```
DETERMINING RE-ALLOCATION PERIODICALLY AND/OR AS
NEEDED TO AVOID CONTAMINATION, BASED ON THE
DYNAMICALLY SELECTED PREDETERMINED PSEUDO-RANDOM
SCHEME, OF AT LEAST ONE OF THE PLURALITY OF HEADER
TIMESLOTS TO AT LEAST ONE USER DEVICE WITHIN THE
PREDETERMINED AREA
520
```

Figure 5

PILOT TMIE SLOT HOPPING

RELATED APPLICATION DATA

This application is a continuation of U.S. patent application Ser. No. 14/413,382, filed Jan. 7, 2015, which is a national phase entry of International Patent Application No. PCT/IB2014/060314, filed Mar. 31, 2014, the disclosures of which are incorporated herein by reference in their entireties.

BACKGROUND

The Third Generation Partnership Project (3GPP) radio access network (RAN) collaboration has addressed massive MIMO systems, and the proposed frame structure is a time division duplex (TDD) with a "header" time slot for user equipment (UE) or user device pilot or training sequence transmission, an uplink (UL) timeslot (optional) and a downlink (DL) timeslot.

BRIEF SUMMARY

Embodiments of the invention are directed to systems, methods and computer program products for pilot time slot hopping to mitigate interference-based pilot time slot contamination. The method includes generating, using a processing device, a multiple input multiple output (MIMO) system message frame structure comprising a header comprising a plurality of header time slots, an uplink (UL) time slot (optional), and a downlink (DL) time slot, where generating comprises determining, based on a predetermined scheme, allocation of at least one of the plurality of header time slots to at least one user device within a predetermined area.

In some embodiments, the header is a user device training sequence header. In some embodiments, the header time slots are pilot time slots.

In some embodiments, one of a plurality of base stations (BSs) and/or access points (APs) comprises the processing device; and each of the plurality of BSs and/or APs are programmed for time synchronization of the frame structure such that each BS and/or AP recognizes when in time the header occurs during MIMO system message transmission.

In some embodiments, generating the MIMO system message frame structure further comprises determining re-allocation, based on the predetermined scheme, periodically of at least one of the plurality of header time slots to at least one user device within the predetermined area. In some such embodiments, the re-allocation is determined periodically at least every millisecond.

In some embodiments, the method also includes determining, by the processing device, that interference-based pilot time slot contamination mitigation is needed; and where generating the MIMO system message frame structure including determining allocation of the at least one of the plurality of header time slots to the at least one user device is performed in response to the determination that interference-based pilot time slot contamination mitigation is needed. In some such embodiments, the method also includes determining, by the processing device, that interference-based pilot time slot contamination mitigation is not needed; and based on the determination that interference-based pilot time slot contamination mitigation is not needed, maintaining present allocation of the at least one of the plurality of header time slots to the at least one user device.

In some embodiments, the method also includes, subsequent to generating the MIMO system message frame structure including determining allocation of the at least one of the plurality of header time slots to the at least one user device, detecting, by the processing device, that interference-based pilot time slot contamination is occurring; and, in response to detecting that interference-based pilot time slot contamination is occurring, determining re-allocation, based on the predetermined scheme, of at least one of the plurality of header time slots to at least one user device within the predetermined area in order to mitigate the detected contamination.

In some embodiments, the plurality of header time slots comprises a first plurality of header time slots and a second plurality of header time slots; the first plurality of header time slots and the second plurality of header time slots are different; and determining allocation of at least one of the plurality of header time slots to at least one user device comprises determining allocation of the first plurality of header time slots based on the predetermined scheme and without determining allocation of the second plurality of header time slots based on the predetermined scheme.

In some embodiments, generating the MIMO system message frame structure further comprises determining re-allocation, based on a second predetermined scheme, of at least one of the plurality of header time slots to at least one user device within the predetermined area; and wherein (1) the second predetermined scheme is the same as the scheme, where the second scheme is initiated at a second start time different from a start time of the scheme; or where the second scheme and the scheme both utilize the same pseudo-random pattern function but the second scheme utilizes at least one different seed than the scheme; or (2) the second predetermined scheme is different than the scheme.

In some embodiments, allocation is based on one of a plurality of predetermined schemes; generating the MIMO system message frame structure further comprises dynamically selecting, in order to avoid allocation of the same header time slots to multiple user devices, a different predetermined scheme for each re-allocation of header time slots; determining re-allocation periodically and/or as needed to avoid contamination, based on the dynamically selected predetermined scheme, of at least one of the plurality of header time slots to at least one user device within the predetermined area.

According to embodiments of the invention, an apparatus for pilot time slot hopping to mitigate interference-based pilot time slot contamination includes a memory; a processor; and a module stored in the memory, executable by the processor, and configured to generate a multiple input multiple output (MIMO) system message frame structure comprising a header comprising a plurality of header time slots, an uplink (UL) time slot (optional), and a downlink (DL) time slot, where generating comprises determining, based on a predetermined scheme, allocation of at least one of the plurality of header time slots to at least one user device within a predetermined area.

In some embodiments, the apparatus is one of a plurality of base stations (BSs) and/or access points (APs); and each of the plurality of BSs and/or APs are programmed for time synchronization of the frame structure such that each BS and/or AP recognizes when in time the header occurs during MIMO system message transmission.

In some embodiments, generating the MIMO system message frame structure further comprises determining re-allocation, based on the predetermined scheme, periodically of at least one of the plurality of header time slots to at least one user device within the predetermined area.

In some embodiments, the module is further configured to determine that interference-based pilot time slot contamination mitigation is needed; and where generating the MIMO system message frame structure including determining allocation of the at least one of the plurality of header time slots to the at least one user device is performed in response to the determination that interference-based pilot time slot contamination mitigation is needed.

In some embodiments, the module is further configured to, subsequent to generating the MIMO system message frame structure including determining allocation of the at least one of the plurality of header time slots to the at least one user device, detect that interference-based pilot time slot contamination is occurring; in response to detecting that interference-based pilot time slot contamination is occurring, determining re-allocation, based on the predetermined scheme, of at least one of the plurality of header time slots to at least one user device within the predetermined area in order to mitigate the detected contamination.

In some embodiments, the plurality of header time slots comprises a first plurality of header time slots and a second plurality of header time slots; the first plurality of header time slots and the second plurality of header time slots are different; and determining allocation of at least one of the plurality of header time slots to at least one user device comprises determining allocation of the first plurality of header time slots based on the predetermined scheme and without determining allocation of the second plurality of header time slots based on the predetermined scheme.

In some embodiments, generating the MIMO system message frame structure further comprises determining re-allocation, based on a second predetermined scheme, of at least one of the plurality of header time slots to at least one user device within the predetermined area; and the second predetermined scheme is different than the scheme.

According to embodiments of the invention, a computer program product for pilot time slot hopping to mitigate interference-based pilot time slot contamination includes a non-transitory computer-readable medium comprising a set of codes for causing a computer to generate a multiple input multiple output (MIMO) system message frame structure comprising a header comprising a plurality of header time slots, an uplink (UL) time slot (optional), and a downlink (DL) time slot, where generating includes determining, based on a predetermined scheme, allocation of at least one of the plurality of header time slots to at least one user device within a predetermined area.

BRIEF DESCRIPTION OF THE DRAWINGS

Having thus described embodiments of the invention in general terms, reference will now be made to the accompanying drawings, where:

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As mentioned above, in massive MIMO systems, the proposed frame structure is TDD with a "header", UL and DL. For efficient network transmission, the header or pilot time slots for multiple UEs should be orthogonal (non-overlapping). This may be difficult because the pilot time slot space or time allocation is limited. One option is to achieve orthogonality by assigning a time slot within the header for each unique UE in a particular area, such as a cell. However, the limited number of time slots, particularly in densely populated cells, may require that time slots are reused for multiple UEs. Further, in some unlicensed bands, reuse of time slots may be required. Thus, when two or more UEs accidentally or inadvertently use the same header time slot, interference will occur, such as channel state information (CSI) interference and inaccuracies.

Accordingly, embodiments of the invention are directed to systems, methods and computer program products for pilot time slot hopping to mitigate interference-based pilot time slot contamination. Embodiments include generating a multiple input multiple output (MIMO) system message frame structure comprising a header comprising a plurality of header time slots, an uplink (UL) time slot (optional), and a downlink (DL) time slot. Generating includes determining, based on a predetermined scheme, allocation of at least one of the plurality of header time slots to at least one user device within a predetermined area. The scheme may be or include a pseudo-random scheme, a cyclic scheme, a non-random scheme, an orthogonal scheme and/or the like.

Figure 1:
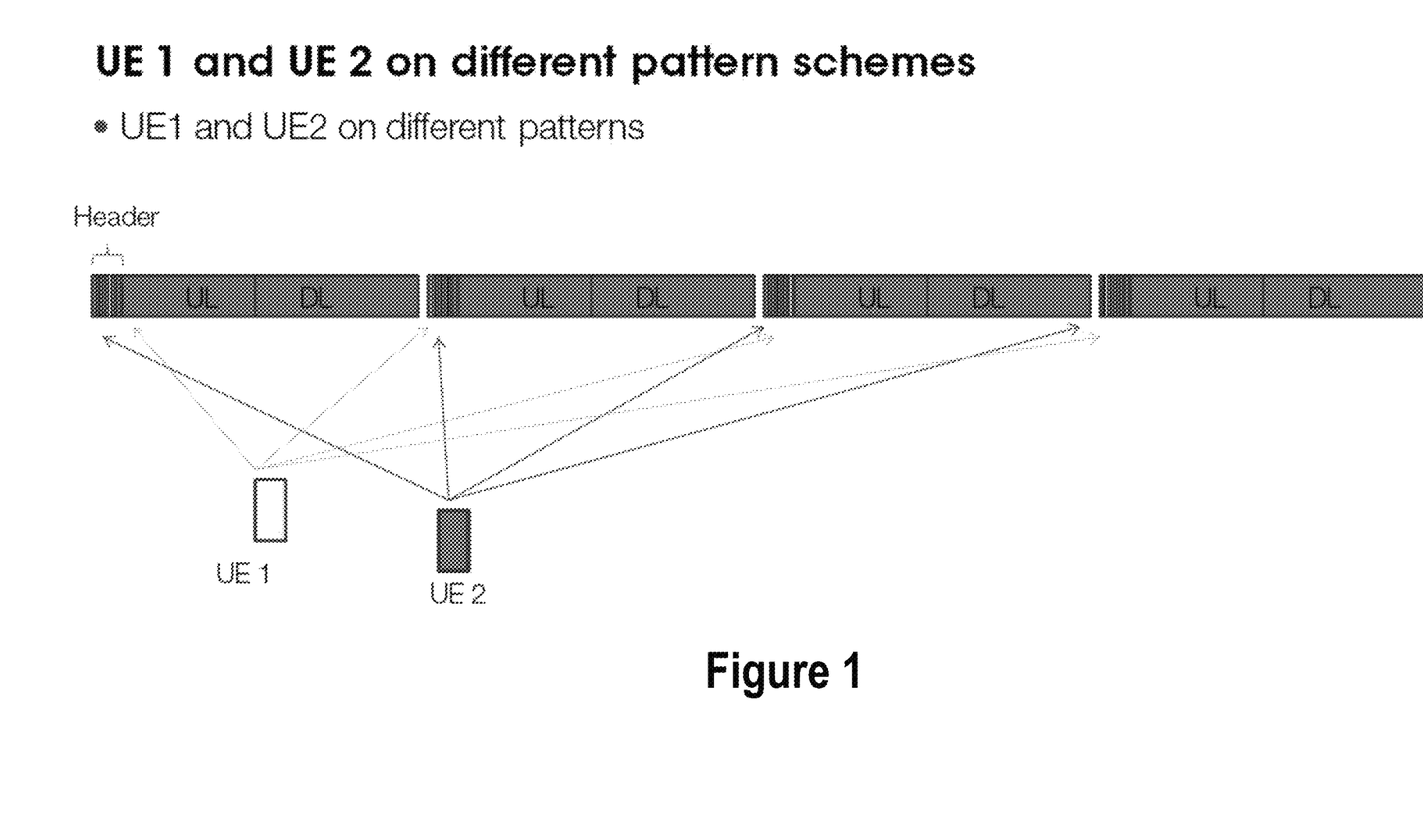
FIG. 1 illustrates two UEs that are allocated difference pilot time slots based on predetermined schemes according to embodiments of the invention.

Referring now to FIG. 1, diagram illustrates a MIMO system message frame structure where UE1 and UE2 have been allocated different time slots within the header for each training sequence according to embodiments of the invention. As shown, for each training sequence, the time slots allocated to UE1 and UE2 do not overlap and therefore, orthogonality is achieved.

Figure 2:
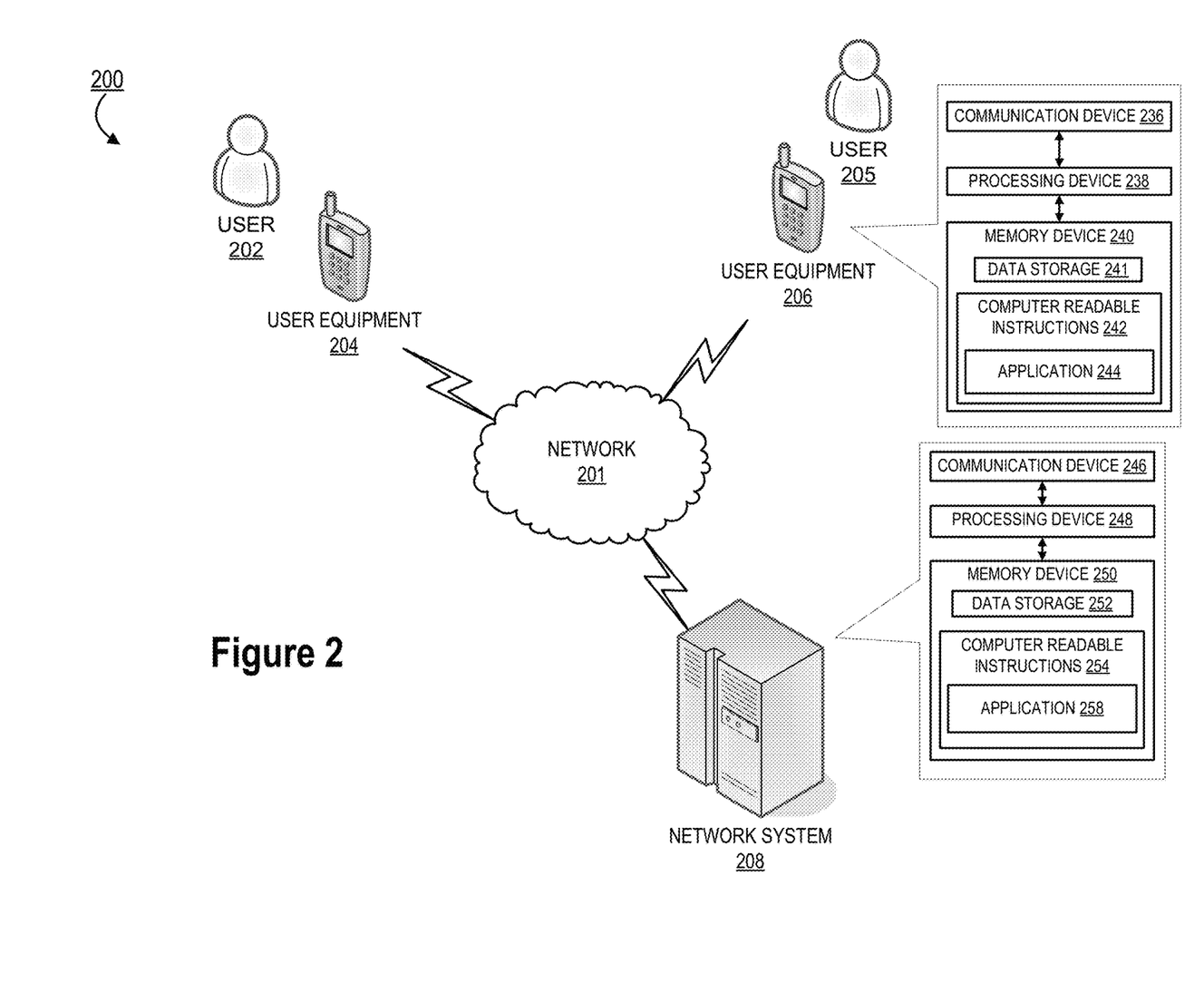
FIG. 2 illustrates an environment wherein user equipment devices and network systems operate according to embodiments of the invention.

Referring now to FIG. 2, a network environment 200 is illustrated in accordance with one embodiment of the present invention. As illustrated in FIG. 2, the network system 208 is operatively coupled, via a network 201 to the user equipment 204 and/or 206. In this configuration, the network system 208 may send information to and receive information from the user equipment devices 204 and/or 206. FIG. 2 illustrates only one example of an embodiment of a network environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), a telecommunication network or any other type of network or combination of networks. The network 201 may provide for wireline, wireless, or a combination wireline and wireless communication between devices on the network 201. In some embodiments, the users 202 and 205 are individuals who maintain cellular products with one or more providers.

As illustrated in FIG. 2, the network system 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201. As such, the communication device 246 generally comprises a modem, server, or other device for communicating with other devices on the network 201.

As further illustrated in FIG. 2, the network system 208 comprises computer-readable instructions 254 stored in the memory device 250, which in one embodiment includes the computer-readable instructions 254 of an application 258 including instructions for performing one or more processes and/or method steps discussed herein and/or one or more processes and/or method steps not discussed herein. In some embodiments, the memory device 250 includes data storage 252 for storing data related to and/or used by the application 258.

As illustrated in FIG. 2, the user equipment 206 (or user device) generally comprises a communication device 236, a processing device 238, and a memory device 240. The processing device 238 is operatively coupled to the communication device 236 and the memory device 240. In some embodiments, the processing device 238 may send or receive data from the user equipment 204, and/or the network system 208 via the communication device 236 over a network 201. As such, the communication device 236 generally comprises a modem, server, or other device for communicating with other devices on the network 201.

As further illustrated in FIG. 2, the user equipment 206 comprises computer-readable instructions 242 stored in the memory device 240, which in one embodiment includes the computer-readable instructions 242 of an application 244 including instructions for performing one or more processes and/or method steps discussed herein and/or one or more processes and/or method steps not discussed herein.

It is understood that the servers, systems, and devices described herein illustrate one embodiment of the invention. It is further understood that one or more of the servers, systems, and devices can be combined in other embodiments and still function in the same or similar way as the embodiments described herein.

Figure 3:
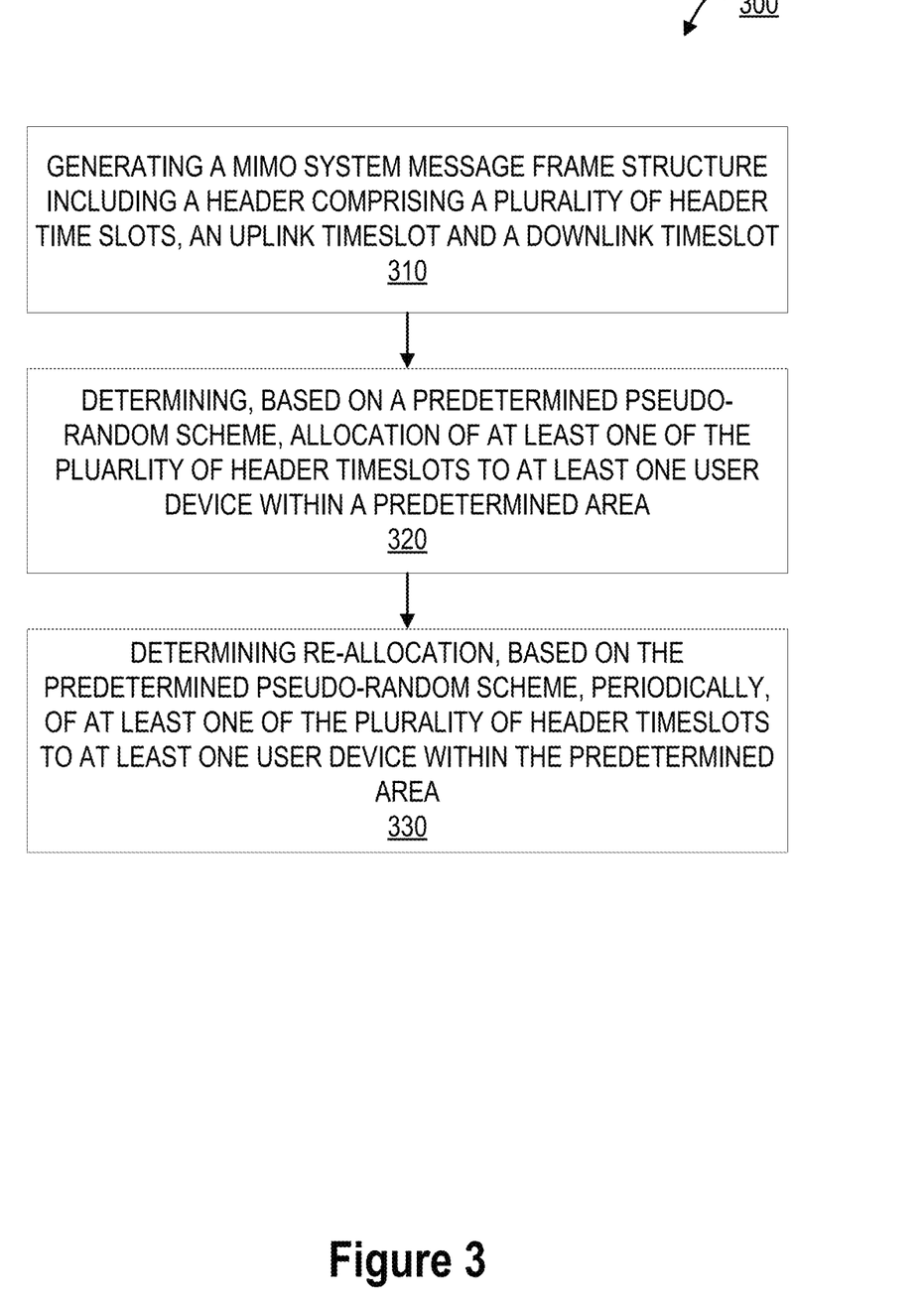
FIG. 3 illustrates a flowchart of a method 300 for pilot time slot hopping to mitigate interference-based pilot time slot contamination according to embodiments of the invention.

Referring now to FIG. 3, a flowchart illustrates a method 300 for pilot time slot hopping to mitigate interference-based pilot time slot contamination according to embodiments of the invention. The first step of method 300, as represented by block 310, is generating, using a processing device (such as a processing device of a base station or access point), a multiple input multiple output (MIMO) system message frame structure. The frame structure includes a header comprising a plurality of header time slots, an uplink (UL) time slot, and a downlink (DL) time slot. In some embodiments, the frame structure only includes pilot and DL time slots and does not include UL time slots. Accordingly, such frames include no payload and may be utilized for UEs in idle mode.

Generating the message frame structure, as represented by block 320, includes determining, based on a predetermined scheme, allocation of at least one of the plurality of header time slots to at least one user device within a predetermined area. The scheme may be pseudo-random, cyclical, non-random, orthogonal and/or the like. In some cases, the header is a UE training sequence header and it may be called a pilot time slot.

Various embodiments discussed herein assume that all base stations (BSs) and/or access points (APs) are synchronized such that they know when the header, UL and DL slots occur. In one example, each of the plurality of BSs and/or APs are preprogrammed for time synchronization of the frame structure such that each BS and/or AP recognizes when in time the header occurs during MIMO system message transmission. In other embodiments, the BS/APs are contemporaneously programmed based on a feature, method, algorithm, process, application or the like.

In various embodiments, the BS/AP allocates the pattern, but in other embodiments, each UE selects a pattern and a UE-ID is included in the pilot time slot. Orthogonal hopping patterns might be generated in different ways. For example, in some cases different random patterns are selected as discussed above. However, in other cases, the same pattern may be used with each UE selecting or being allocated (by a BS/AP) different start points or the same "random pattern function" but with different seeds.

In some embodiments, the method 300 includes periodically determining re-allocation, based on the predetermined scheme, of at least one of the plurality of header time slots to at least one user device within the predetermined area, as represented by block 330. In some such embodiments, re-allocation may be periodically determined at least every millisecond.

Figure 4:
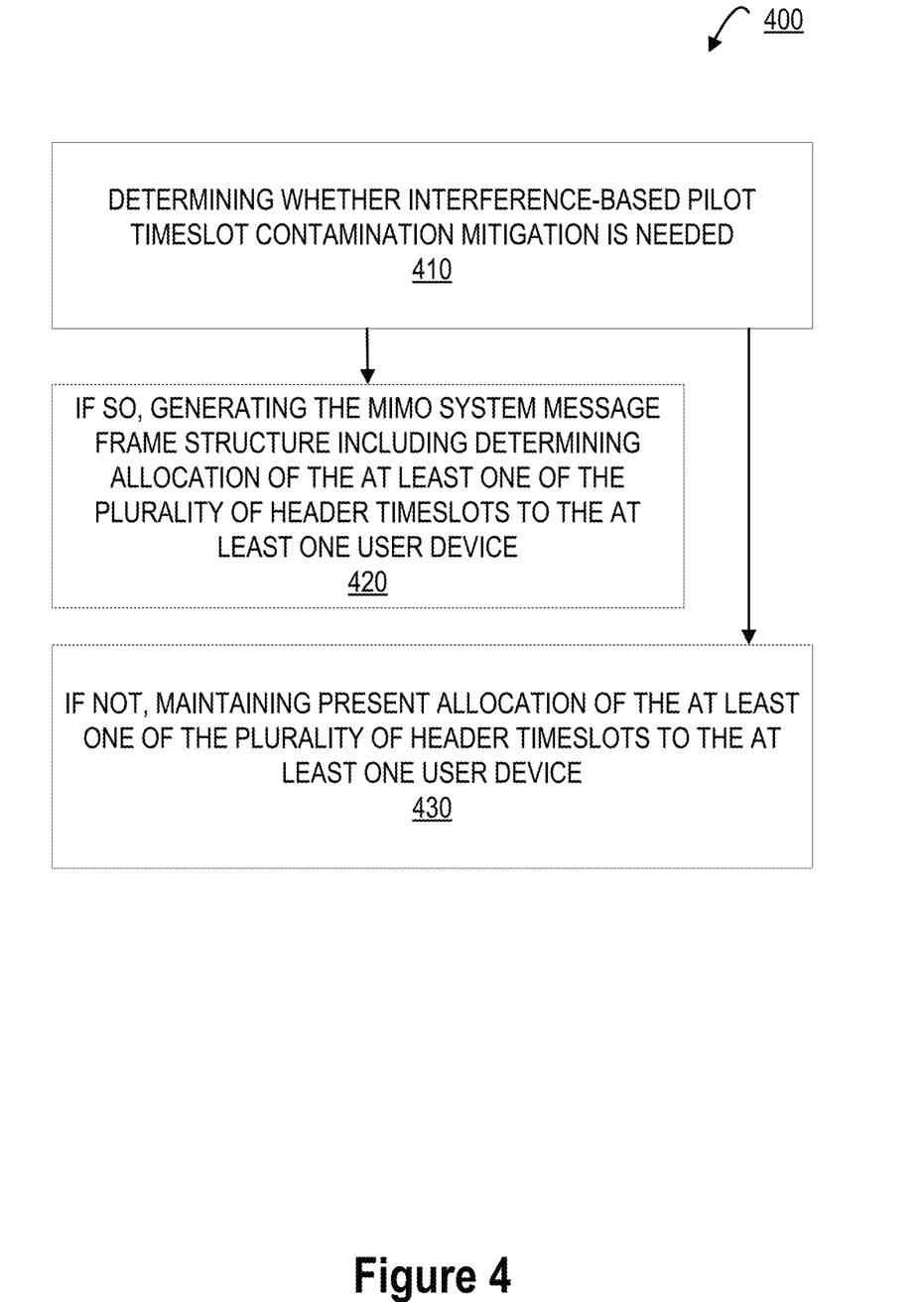
FIG. 4 illustrates a flowchart of another method 400 for pilot time slot hopping to mitigate interference-based pilot time slot contamination according to embodiments of the invention.

Referring now to FIG. 4, a method 400 includes some steps that may be included with the steps discussed with reference to method 300 of FIG. 3 according to embodiments of the invention. First, as represented by block 410, the system determines whether interference-based pilot time slot contamination mitigation is needed. This may be done by detecting whether contamination or interference of transmission is occurring on the network. The system may determine contamination is occurring in a variety of ways. For example, pilot contamination will cause increased BER (bit error state), SNR (signal to noise and interferer ratio) degradation or contamination may possibly be detected in the footprint. Applying time slot hopping might mitigate such contamination by itself or may require additional methods for effective contamination mitigation. Accordingly, other tools may be used in conjunction with the time hopping methods disclosure herein to improve communication. Such other methods that might be used in conjunction include frequency band re-selection, synchronization to neighbor cells, applying additional multiple access (MA) method(s) and/or applying spreading (coding), and/or changing modulation scheme(s) for higher robustness. In some cases, synchronization might be required in order for hopping to assist in mitigation of contamination, therefore requiring pairing with another method in some cases. For example, if a UE or BS/AP detects high BER and attempts to change the pilot time slot (based on a standard time slot allocation) without improving the high BER, time slot hopping can be activated and average BER may thereby improve.

If mitigation is needed, as represented by block 420, generating the MIMO system message frame structure includes determining allocation of the at least one of the plurality of header time slots to the at least one UE. In other words, allocation of the header time slots to the UEs may be performed in response to a determination that contamination mitigation is needed.

If it is determined that mitigation is not needed, as represented by block 430, the method includes maintaining present allocation of the header time slots to the UEs. In other words, the system may maintain the current time slot allocation in response to determining that no contamination mitigation is necessary. The system may determine that contamination is not occurring (or is not likely to occur) by measuring metrics described above such as the BER. If one or more of such metrics are better, time slot hopping may be deactivated. In some cases, one or more of the metrics are continually (or periodically) monitored when/while time slot hopping is deactivated, and if it is determined that one or more of the metrics is not meeting desired thresholds or standards, then time hopping may then be reactivated. For example, the system may detect that there is high BER on only some frames when a collision occurs. In such a cases, the system may deactivate time slot hopping and finding/allocating an open or "free" time slot may prove more economical and/or efficient.

In some embodiments, the method includes detecting that interference-based pilot time slot contamination is occurring after generating the MIMO system message frame structure (see step 310. Then, in response to detecting that contamination is occurring with the originally allocated time slots, the method then determines re-allocation. The re-allocation may be based on the same predetermined scheme that was used in the original allocation.

In some embodiments, allocation based on predetermined (or dynamically selected) schemes is only applied to one or more sub-sets of the entire set of pilot time slots. In other words, the plurality of header time slots may be broken into a first plurality of header time slots and a second plurality of header time slots, where the first plurality of header time slots and the second plurality of header time slots are different. In these embodiments, the allocation of one of the sub-sets of time slots may be determined based on the predetermined (or dynamically selected) scheme and allocation of the other sub-set(s) may be based on some other scheme, such as a simple assignment of time slots to UEs.

In some embodiments, the system uses different patterns or schemes dynamically selected in order to avoid using the same schemes. Then, as represented by block 520, the system may determine re-allocation based on a second predetermined scheme that is different than the originally used scheme.

Figure 5:
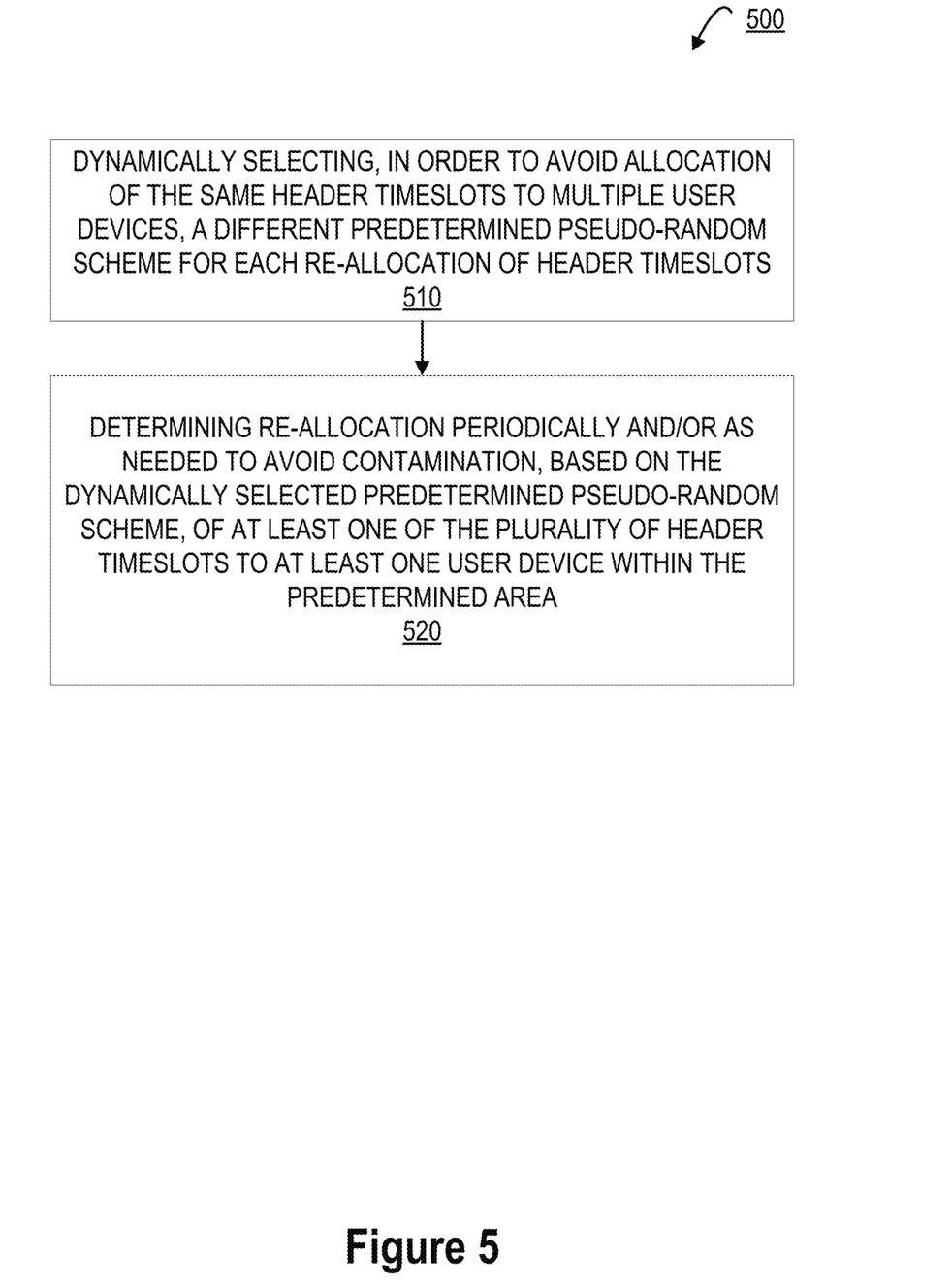
FIG. 5 illustrates a flowchart of another method 500 for pilot time slot hopping to mitigate interference-based pilot time slot contamination according to embodiments of the invention.

Referring now to FIG. 5, a method 500 includes steps that may be included with the steps discussed with reference to method 300 of FIG. 3. In some cases, allocation is based on one of a plurality of predetermined schemes. Generating the message frame structure may include dynamically selecting, in order to avoid allocation of the same header time slots to multiple user devices, a different predetermined scheme for each re-allocation of header time slots, as represented by block 510. Then, the system determines re-allocation periodically and/or as needed to avoid contamination, based on the dynamically selected predetermined scheme, as represented by block 520.

When there are many UEs connected to a single BS or AP within a single cell, various embodiments of the invention enable orthogonal allocation of pilot time slots using pilot time slot hopping methods discussed herein. Thus, a possible contamination from a neighboring cell may have the same system impact but will not harm only a single UE's transmissions. Further, introduction of time slot hopping has little or no throughput cost.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for managing multiple input multiple output (MIMO) system messages in a massive MIMO system, each MIMO system message having a header with a header frame structure comprising a sequence of plural header time slots, the method comprising:
    (a) allocating one of the plurality of header time slots as a pilot signal time slot to a first user device that operates in the massive MIMO system;
    (b) monitoring a metric indicative of pilot contamination between the first user device and a second user device, wherein (i) if the metric does not indicate the pilot contamination, then maintaining the header time slot allocation of (a) for consecutive MIMO system messages or (ii) if the metric does indicate the pilot contamination, then:
    (c) activating pilot time slot hopping, the pilot time slot hopping comprising reallocating the pilot signal time slot allocated to the first user device in (a) to a different header time slot in the sequence of plural header time slots; and
    (d) determining that pilot contamination mitigation is no longer needed and deactivating the pilot time slot hopping so that the header time slot allocation at the time of deactivating the pilot time slot hopping is maintained for consecutive MIMO system messages.

2. The method of claim 1, wherein the reallocating of (c) is carried out periodically until (d) is carried out.

3. The method of claim 2, wherein the reallocating of (c) is carried out every millisecond until (d) is carried out.

4. The method of claim 1, wherein the reallocating of (c) is carried out for each MIMO system message until (d) is carried out.

5. The method of claim 1, further comprising, in (a), allocating another of the plurality of header time slots as a pilot signal time slot to the second user device that operates in the massive MIMO system, the header time slots respectively allocated to the first and second user devices as pilot signal time slots being different header time slots of the sequence of plural header time slots; and wherein (c) is carried out without reallocating the pilot signal time slot allocated to the second user device.

6. The method of claim 1, wherein the allocation of (a) to the first user device is carried out using a predetermined one of plural allocation schemes.

7. The method of claim 6, wherein the reallocating of (c) is carried out with the predetermined one of the plural allocation schemes used to carry out the allocation of (a).

8. The method of claim 6, wherein the reallocating of (c) is carried out using another of the plural allocation schemes.

9. The method of claim 6, wherein the reallocating of (c) is carried out using one of the plural allocation schemes that is dynamically selected.

10. The method of claim 1, wherein the method is carried out by a network access node of the massive MIMO system with which the first and second user devices communicate.

11. The method of claim 1, wherein the header is a user device training sequence header.

12. A massive multiple input multiple output (MIMO) network access node in a massive MIMO system, the network access node managing system messages in the massive MIMO system, each MIMO system message having a header with a header frame structure comprising a sequence of plural header time slots, the network access node comprising:
a memory;
at least one processor; and
a module stored in the memory, executable by the at least one processor, and configured to:
(a) allocate one of the plurality of header time slots as a pilot signal time slot to a first user device that operates in the massive MIMO system;
(b) monitor a metric indicative of pilot contamination between the first user device and a second user device, wherein (i) if the metric does not indicate the pilot contamination, then maintain the header time slot allocation of (a) for consecutive MIMO system messages or (ii) if the metric does indicate the pilot contamination, then:
(c) activate pilot time slot hopping, the pilot time slot hopping comprising reallocating the pilot signal time slot allocated to the first user device in (a) to a different header time slot in the sequence of plural header time slots; and (d) determine that pilot contamination mitigation is no longer needed and deactivate the pilot time slot hopping so that the header time slot allocation at the time of deactivating the pilot time slot hopping is maintained for consecutive MIMO system messages.

13. The massive MIMO network access node of claim 12, wherein the reallocating of (c) is carried out periodically until (d) is carried out.

14. The massive MIMO network access node of claim 13, wherein the reallocating of (c) is carried out every millisecond until (d) is carried out.

15. The massive MIMO network access node of claim 12, wherein the reallocating of (c) is carried out for each MIMO system message until (d) is carried out.

16. The massive MIMO network access node of claim 12, wherein the module is further configured, in (a), to allocate another of the plurality of header time slots as a pilot signal time slot to the second user device that operates in the massive MIMO system, the header time slots respectively allocated to the first and second user devices as pilot signal time slots being different header time slots of the sequence of plural header time slots; and wherein (c) is carried out without reallocating the pilot signal time slot allocated to the second user device.

17. The massive MIMO network access node of claim 12, wherein the allocation of (a) to the first user device is carried out using a predetermined one of plural allocation schemes.

18. The massive MIMO network access node of claim 17, wherein the reallocating of (c) is carried out with the predetermined one of the plural allocation schemes used to carry out the allocation of (a).

19. The massive MIMO network access node of claim 17, wherein the reallocating of (c) is carried out using another of the plural allocation schemes.

20. The massive MIMO network access node of claim 17, wherein the reallocating of (c) is carried out using one of the plural allocation schemes that is dynamically selected.

21. The massive MIMO network access node of claim 12, wherein the header is a user device training sequence header.

* * * * *